United States Patent Office 2,695,317
Patented Nov. 23, 1954

2,695,317

2,2'-DIHYDROXY-3,5,5'-TRICHLORODIPHENYL SULFIDE AND PREPARATION THEREOF

Royal A. Cutler, Troy, N. Y., assignor to Sterling Drug Inc., New York, N. Y., a corporation of Delaware No Drawing. Application April 10, 1952,
Serial No. 281,687

2 Claims. (Cl. 260—609)

This invention relates to 2,2'-dihydroxy-3,5,5'-trichlorodiphenyl sulfide, having the structural formula

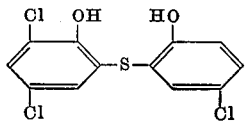

and to a method for preparing the same.

In accordance with my invention, 2,2'-dihydroxy-5,5'-dichlorodiphenyl sulfide is interacted with sulfuryl chloride and the 2,2'-dihydroxy-3,5,5'-trichlorodiphenyl sulfide thus formed is isolated. The reaction proceeds very rapidly even at low temperatures, for example at $-10°$ C., and if the reactants are well stirred, the reaction is generally substantially complete within a few minutes. In order to insure the maximum yield of the desired reaction product, it may be preferable, when convenient, to continue stirring the reaction mixture for 15–60 minutes or more, although this is usually not necessary, especially when small quantities of the reactants are employed. It is desirable to conduct the reaction at a temperature below 50° C., and advantageously in the range 0–30° C. When the reaction is conducted at substantially higher temperatures, for example at 80–100° C., lowered yields of the 2,2'-dihydroxy-3,5,5'-trichlorodiphenyl sulfide result and moreover the desired product is more difficult to isolate since undesired decomposition products are also produced in the reaction mixture under these conditions.

It will be appreciated that complete interaction of the 2,2'-dihydroxy-5,5'-dichlorodiphenyl sulfide and the sulfuryl chloride requires, in accordance with theory, equimolecular quantities of the two reactants to produce the desired trichloro product, and thus, for reasons of economy, at least one equivalent of the sulfuryl chloride per equivalent of the organic reactant should be employed. However, a considerable excess of the sulfuryl chloride, for example up to two or three equivalents per equivalent of 2,2'-dihydroxy-5,5'-dichlorodiphenyl sulfide, can be employed without appreciable effect on the yield of the desired 2,2'-dihydroxy-3,5,5'-trichlorodiphenyl sulfide when the reaction is conducted at temperatures below 50° C.

For best results, the reaction is carried out in any inert organic medium which has at least a slight solvent action toward the 2,2'-dihydroxy-5,5'-dichlorodiphenyl sulfide. The reaction can be conducted very successfully in solvents having a low solubilizing effect by making a suspension or slurry of the 2,2'-dihydroxy-5,5'-dichlorodiphenyl sulfide in the solvent. The choice of the reaction medium is not critical and can be varied widely without adverse effect. For example, typical organic solvents which I have found to be satisfactory are glacial acetic acid, nitroethane, ethyl ether, nitrobenzene and acetonitrile. Solvents such as carbon tetrachloride, in which the 2,2'-dihydroxy-5,5'-dichlorodiphenyl sulfide is practically insoluble, should not be employed alone as the reaction medium, but are quite suitable when used in admixture with other compounds having a greater solvent action, such as ethyl ether.

The 2,2'-dihydroxy-3,5,5'-trichlorodiphenyl sulfide provided by my invention is surprisingly active as an antibacterial agent and as an antifungal agent, and it is particularly adapted for surface and topical use. For example, my new compound has been found to have high activity against Staphylococcus aureus, Streptococcus hemolyticus, Clostridium welchii, Mycobacterium tuberculosis, Trichophyton interdigitale and Trichophyton mentagrophytes. For these purposes, the compound can be employed in conventional vehicles in either the free phenolic form or, alternatively, in the form of a salt. The salt forms of the compounds are readily obtained by interacting the phenolic form with one or two equivalents of an inorganic or organic base, for example, such as an alkali metal or alkaline earth metal hydroxide or carbonate or an organic amine. For example, the interaction of the phenolic form with one equivalent of sodium hydroxide yields the monosodium salt; and, using two equivalents of sodium hydroxide, the disodium salt of the phenol is produced.

The new 2,2'-dihydroxy-3,5,5'-trichlorodiphenyl sulfide, and equivalently the salts thereof, of my invention retain high antibacterial and antifungal activity in the presence of soaps and non-saponaceous synthetic detergents. The monosodium salt of the compound is an especially useful form for incorporation into soaps.

My invention is illustrated by the following examples without, however, being restricted thereto.

Example 1

241 g. of 2,2'-dihydroxy-5,5'-dichlorodiphenyl sulfide was slurried with 1300 ml. of glacial acetic acid at 18° C. and to this slurry there was added rapidly in a single portion 70 ml. of sulfuryl chloride with stirring. Most of the solid in the suspension dissolved in about one minute to yield a thin slurry, and then a solid product immediately precipitated from the solution. After stirring the reaction mixture for 15–20 minutes, the solid product was collected on a filter, washed with a few ml. of acetic acid, and dried. There was thus obtained 165 g. of white crystalline solid which melted at 168–170° C. with slight softening at 166° C. Recrystallization of this product from 1850 ml. of benzene followed by an additional recrystallization from 1650 ml. of ethylene chloride gave 122 g. of pure 2,2'-dihydroxy-3,5,5'-trichlorodiphenyl sulfide in the form of fluffy white needles which melted at 171.1–172.3° C.

The product obtained above was practically insoluble in water, but was readily soluble in ethyl ether, dioxane, acetone, and ethyl alcohol. The compound was dissolved in N/10 aqueous sodium hydroxide to form a 1% (weight/volume) solution having pH 11.7. The free phenol was also dissolved in 95% ethyl alcohol to form a 5% (weight/volume) solution; this solution remained clear when mixed with four volumes of water.

Example 2

To a slurry of 10 g. of 2,2'-dihydroxy-5,5'-dichlorodiphenyl sulfide in 60 ml. of glacial acetic acid at about 15° C. was added in one portion 6 ml. of sulfuryl chloride. The suspended solid material quickly went into solution followed by almost immediate separation of a solid product from the solution. This product was collected on a filter and washed with a few ml. of acetic acid. There was thus obtained 4.5 g. of 2,2'-dihydroxy-3,5,5'-trichlorodiphenyl sulfide which melted at 164–166° C. Recrystallization of the product from benzene yielded 2.5 g. of the pure compound.

Example 3

14.3 g. of 2,2'-dihydroxy-5,5'-dichlorodiphenyl sulfide was slurried in 88 ml. of nitroethane and to this slurry at 0° C. there was added rapidly with stirring 4.1 ml. of sulfuryl chloride. The reaction mixture was allowed to stand for one hour at 0° C., and was then filtered. The residue thus collected was washed with a few ml. of nitroethane and dried. There was obtained in this manner 8 g. of product which melted at 168–170° C. Recrystallization of this product from ethylene dichloride yielded pure 2,2'-dihydroxy-3,5,5'-trichlorodiphenyl sulfide.

Example 4

14.3 g. of 2,2'-dihydroxy-5,5'-dichlorodiphenyl sulfide was dissolved in 50 ml. of anhydrous ethyl ether and to this solution at $-10°$ C. was added 4.1 ml. of sulfuryl chloride. The reaction mixture was allowed to stand at room temperature (circa 25° C.) for one hour, and then the ether was distilled from the mixture. The orange colored residual product was slurried with carbon tetrachloride and the slurry was filtered. The insoluble solid which was thus collected was washed with carbon tetrachloride and dried. In this manner, there was obtained 8.4 g. of product melting at 168–170° C. By recrystallizing this product from benzene, there was obtained pure 2,2'-dihydroxy-3,5,5'-trichlorodiphenyl sulfide.

Using the same quantities of the dichlorodihydroxydiphenyl sulfide and sulfuryl chloride set forth in Example 4 above, but conducting the reaction for one hour at 5° C. in nitrobenzene produced an initial yield of 7.3 g. of crude 2,2'-dihydroxy-3,5,5'-trichlorodiphenyl sulfide, which melted at 166–169° C.; when the reaction was conducted for one hour at 5° C. in acetonitrile the crude yield of the desired product was 5.5 g., which melted at 168–170° C.

I claim:

1. 2,2'-dihydroxy-3,5,5'-trichlorodiphenyl sulfide, having the formula

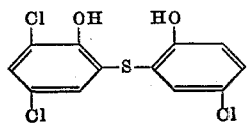

2. The process which comprises interacting 2,2'-dihydroxy-5,5'-dichlorodiphenyl sulfide with sulfuryl chloride, and isolating the 2,2'-dihydroxy-3,5,5'-trichlorodiphenyl sulfide thus produced.

References Cited in the file of this patent

UNITED STATES PATENTS

| Number | Name | Date |
|---|---|---|
| 2,353,735 | Kunz et al. | July 18, 1944 |

FOREIGN PATENTS

| Number | Country | Date |
|---|---|---|
| 349,004 | Great Britain | May 12, 1931 |

OTHER REFERENCES

Groggins, "Unit Processes in Organic Synthesis," page 221, McGraw-Hill Co. (1947).